United States Patent [19]

Tanaka

[11] Patent Number: 4,733,346

[45] Date of Patent: Mar. 22, 1988

[54] DATA PROCESSOR WITH MULTIPLE REGISTER BLOCKS

[75] Inventor: Koichi Tanaka, Kawasaki, Japan

[73] Assignee: Kabushiki Kaisha Toshiba, Kawasaki, Japan

[21] Appl. No.: 763,716

[22] Filed: Aug. 8, 1985

[30] Foreign Application Priority Data

Aug. 20, 1984 [JP] Japan ................. 59-172742

[51] Int. Cl.[4] .................. G06F 9/06; G06F 13/00
[52] U.S. Cl. .................................... 364/200
[58] Field of Search ... 364/200 MS File, 900 MS File

[56] References Cited

U.S. PATENT DOCUMENTS

| | | | |
|---|---|---|---|
| 4,268,901 | 5/1981 | Subrizi et al. | 364/200 |
| 4,298,954 | 11/1981 | Bigelow et al. | 364/900 |
| 4,459,657 | 7/1984 | Murao | 364/200 |
| 4,493,020 | 1/1985 | Kim et al. | 364/200 |
| 4,530,047 | 7/1985 | Rogers et al. | 364/200 |

OTHER PUBLICATIONS

Paterson, et al., "A VLSI RISC", IEEE Computer, vol. 15, pp. 8–21 Sep. 1982.

Primary Examiner—Gareth D. Shaw
Assistant Examiner—Rebecca L. Adams
Attorney, Agent, or Firm—Finnegan, Henderson, Farabow, Garrett & Dunner

[57] ABSTRACT

A data processing apparatus includes a plurality of register blocks, each having a plurality of registers, an external memory either to save data in the register blocks or to restore data in the register blocks, and a data processing unit to execute a program using at least one of these register blocks. This data processing unit generates a first or a second signal when a subroutine call or a return occurs in the program being executed. The data processing apparatus further includes a memory interface to execute the data transfer between the register block set in the "save" or "restore" state and the external memory when the first or second signal is generated, and a register control for setting at least one of those register blocks in a state that can be used by the program executing means, and for setting a different register block into the "save" or "restore" state in response to the first or second signal.

16 Claims, 10 Drawing Figures

FROM DECODER 16A

DATA PROCESSOR WITH MULTIPLE REGISTER BLOCKS

BACKGROUND OF THE INVENTION

The present invention relates to a data processing apparatus which executes data processing in accordance with a program including a subroutine call and a return.

Hitherto, when a subroutine call occurs during execution of a program, a parameter for execution of the subroutine or to transfer data from a register to an external memory to keep the data in the register must be read out. For this purpose, a stack area is provided in the external memory, and the data is transferred betweeh the register and the external memory by way of PUSH and POP instructions.

Generally, a PUSH instruction is an instruction to store data in the memory address of the stack area designated by a stack pointer in a central processing unit (CPU), and, thereafter, to change the content of this stack pointer to designate a memory address which is smaller by one block of data. The POP instruction, conversely, is an instruction to change the content of the stack pointer such that the stack pointer designates the memory address which is larger by one block of data, and then to read out the data from the memory address designated as such. Therefore, insofar as data is read out from or written into the external memory by only the PUSH and POP instructions, only the data in the highest order memory address in the stack area is processed. Thus, the data having been saved in this stack area when a subroutine call occurs is retained with certainly.

Ordinarily, a number of registers are included in the CPU. In association with the use of high-level language, the number of data exchanges between the registers and the external memory increases, as does the number of parameters which should be passed or received, so that the number of accesses to the external memory also increases. Further, since it is necessary to receive and pass a plurality of parameters in the stack area in accordance with an arbitrary sequence, calculation of a desired memory address, by adding the address designated by the stack pointer and the offset value, must be performed for each access. The address calculation process, however, takes a very long time and, as such, hinders the overall operating speed of the apparatus.

At present, in spite of the fact that the operating speed of the CPU itself is high, the waiting time of the CPU is prolonged since access time to a large capacity memory is not sufficiently short. Consequently, the overall processing speed is reduced and cannot be improved until access time is reduced.

To reduce the access time and to raise the data processing speed, various conventional methods have been considered.

For example, in a method using a CPU "i80186" made by Intel Co., Ltd. in the U.S.A, data in all registers are written into or read out from the stack area of the external memory by way of a PUSH ALL or a POP ALL instruction. In this method, although it is sufficient to use only a single time of procedure for instruction fetch and interpretation, the next instruction cannot be executed until the data transfer is completed. Therefore, eventually, the total time required to save and restore the data is not reduced much.

A second method uses a CPU "TMS 9900" made by Texas Instruments Co., Ltd. in the U.S.A. This CPU has a work space pointer to designate addresses in all register regions formed in the external memory. According to this method, when a subroutine call or the like occurs, data in the register is not saved in the stack area, but, rather, the content of the work space pointer is merely changed, thereby making it possible to obtain an effect similar to that wherein data in the register is saved in another memory area. Nevertheless, the data processing speed cannot be increased, since it takes a long time to access the register region formed in the external memory.

Further, there is an "RISC" method created by University of California, Berkeley in the U.S.A. According to this method, a number of register groups are provided in the CPU and, by use of these register groups, there is no need to access the external memory when data in the register is saved or parameters are received and passed. Practically speaking, the register groups which can be accessed are limited to execution of a subroutine. These accessible register groups are classified into general purpose registers, registers to receive the parameters and registers to pass the parameters. In the case where a subroutine call occurs, the registers used to pass the parameters in execution of the main routine are used as registers to receive the parameters upon execution of the subroutine. In contrast, the registers used for data reception and for general purpose functions during execution of the main routine are set into an unusable state during execution of the subroutine.

In this "RISC" method, no parameter is transferred at all when the subroutine call occurs so the operation to save data is not needed and a very high-speed subroutine call is realized. However, if a number of subroutine calls occur continuously, it is necessary to transfer a part of the content of the register into the external memory at a certain point in time because there is a limit to the number of register groups available in the CPU. In addition, to reduce the overhead, a very large number of registers, for example, 138 registers, are needed, most of the space of the CPU being occupied by these registers.

SUMMARY OF THE INVENTION

It is an object of the present invention to provide a data processing apparatus which can reduce the overhead without using an extremely large number of registers.

This object is accomplished through a data processing apparatus comprising a plurality of register blocks, each of which include a plurality of registers, an external memory, a program executing unit which accesses at least one of the plurality of register blocks and executes a program including a subroutine call and a return, and which, when the subroutine call or return occurs in the program being executed, respectively generates a subroutine call signal or a return signal; a memory interface which holds addresses in the external memory and which, when the subroutine call signal or return signal is generated from the program executing unit, executes the data transfer between the external memory and the register block set in the "save" or "restore" state among the plurality of register blocks, and which generates an end signal upon completion of the data transfer; and a register control which sets at least one of the plurality of register blocks in a state that can be accessed by the program executing unit in response to the subroutine call signal or return signal from the program executing unit, and which respectively will selectively sets a different one of those register blocks in "save" or "restore" state, and which selectively sets at least one of the plurality of register blocks in a state that can be used generally by the program executing unit in response to the end signal from the memory interface.

In this invention, when the data transfer is being executed between the external memory and one of the register blocks under control of the memory interface, the program executing unit can access a different one of the register blocks to execute the program; therefore, the overhead can be suppressed and shortened.

DETAILED DESCRIPTION OF THE PREFERRED EMBODIMENT

Figure 1:
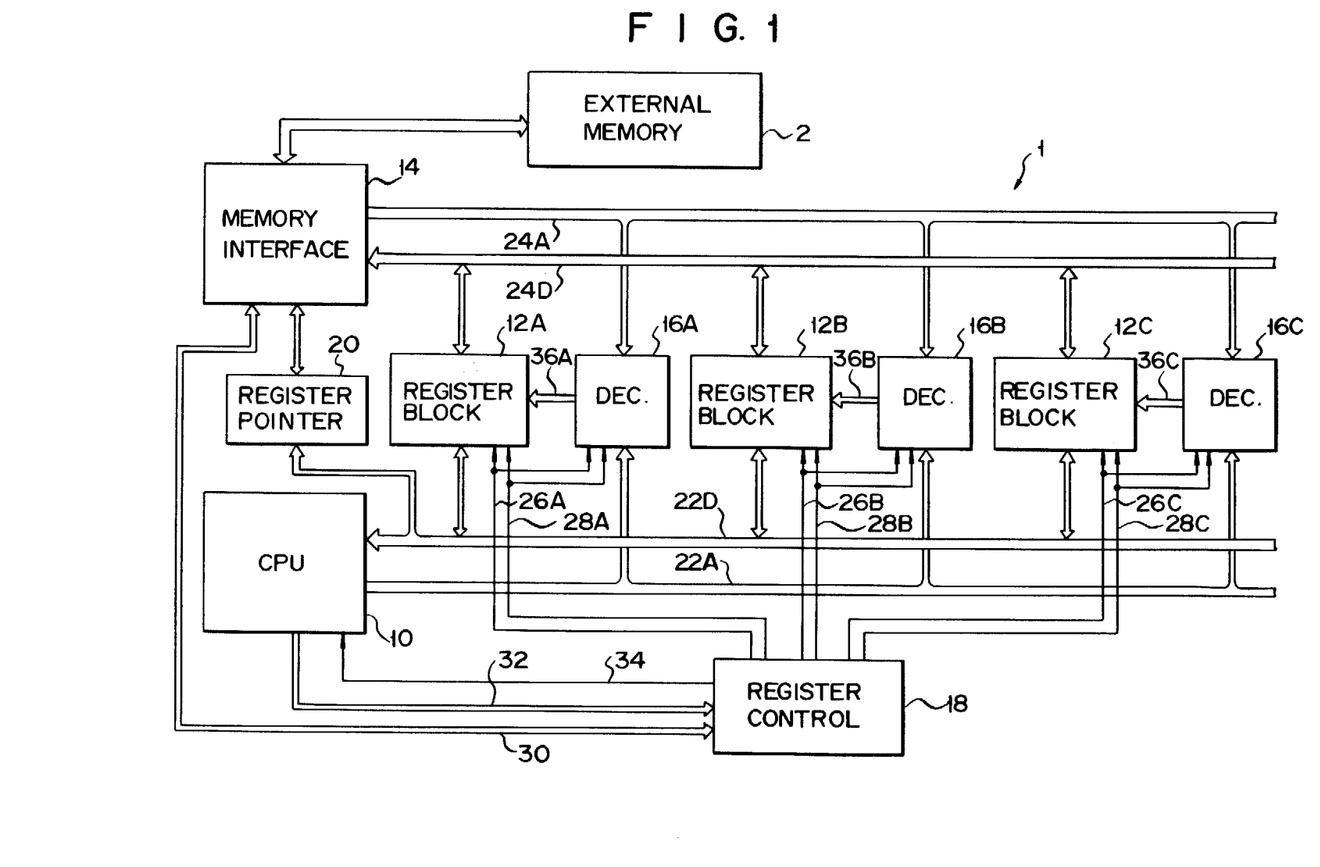
FIG. 1 is a block diagram of a data processing apparatus according to one embodiment of the present invention.

FIG. 1 is a block diagram of a data processing apparatus according to one embodiment of the present invention. This data processing apparatus is provided with a microprocessor 1 and an external memory 2. The microprocessor 1 comprises a CPU 10; three register blocks 12A to 12C, each of which includes a plurality of registers; a memory interface 14 to execute data transfer between the external memory 2 and the register blocks 12A to 12C; decoder circuits 16A to 16C coupled, respectively, to the register blocks 12A to 12C; a register control unit 18 to control the operations of the register blocks 12A to 12C and decoder circuits 16A to 16C; and a register pointer 20 to designate read and write addresses of data from and into the external memory 2.

The CPU 10 is connected through a data bus 22D to the register blocks 12A to 12C, and register pointer 20 and is connected through an address bus 22A to the decoder circuits 16A to 16C. The memory interface 14 is connected through a data bus 24D to the register blocks 12A to 12C, and is connected through an address bus 24A to the decoder circuits 16A to 16C. The memory interface 14 is also connected to the external memory 2 and register pointer 20.

The register control unit 18 is connected to the register block 12A and decoder circuit 16A through control lines 26A and 28A, to the register block 12B and decoder circuit 16B through control lines 26B and 28B, and to the register block 12C and decoder circuit 16C through control lines 26C and 28C, respectively. Further, the register control unit 18 is connected to the memory interface 14 through a control bus 30, and to the CPU 10 through a control bus 32 and a control signal line 34. Output data from the decoder circuits 16A to 16C are supplied to the register blocks 12A to 12C through buses 36A to 36C, respectively.

The memory interface 14 transfers data between the external memory 2 and the register blocks 12A to 12C under control of the register control unit 18. The register pointer 20 holds addresses to designate memory locations in the external memory 2 when data is saved in the external memory 2 or the data from the external memory 2 is restored. The addresses of the register pointer 20 are read out or written by way of the CPU 10 or memory interface 14.

The data bus 32 includes a signal line 32A for transmitting an AS signal generated by the CPU 10 to access the register block which has been set in state "A" and a signal line 32B for transmitting a BS signal generated to access the register block which has been set in state "B", a signal line 32C for transmitting an SC signal generated when a subroutine call occurs, a signal line 32D for transmitting an SR signal generated when a subroutine return occurs, a signal line 32E for transmitting a sampling pulse SP used for sampling SC and SP signals, and a signal line 32F for transmitting a reset signal RST to set the register control unit 18 in the initial state.

The data bus 30 includes a signal line 30A for transmitting a save request signal SRQ requiring that data in the register block 12A, 12B or 12C be stored into the external memory 2 from the register control unit 18 to the memory interface 14, a signal line 30B for transmitting a restore request signal RRQ requesting that the data saved in the external memory 2 be restored to the register block 12A, 12B or 12C from the register control unit 18 to the memory interface 14, and a signal line 30C for transmitting an operation end signal END generated from the memory interface 14 to the register control unit 18 when the reading or writing of data in the memory interface 14 is completed.

Figure 2:
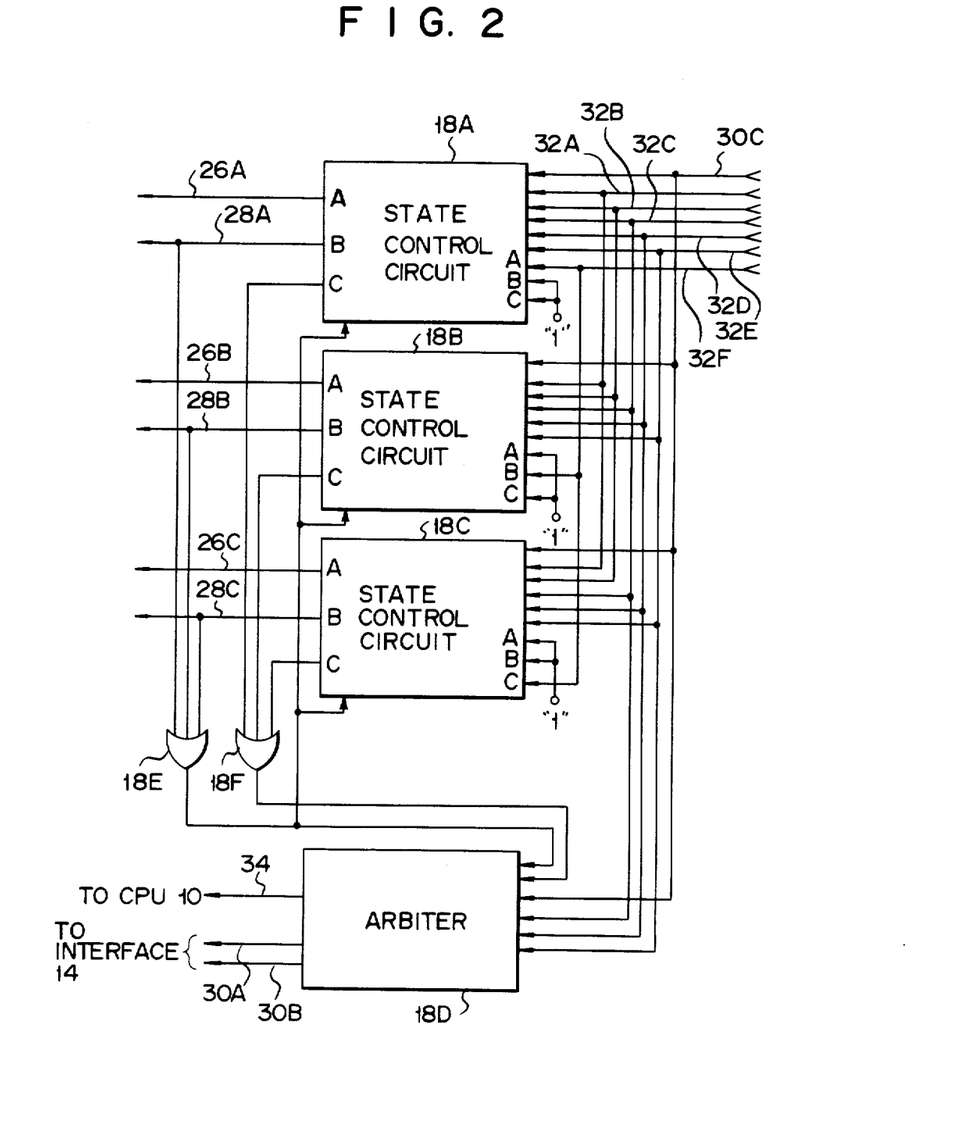
FIG. 2 is a circuit diagram of a register control unit which is used in the data processing apparatus shown in FIG. 1.

FIG. 2 is a block diagram of the register control unit 18. The register control unit 18 includes state control circuits 18A to 18C for controlling the states of the register blocks 12A to 12C, and an arbiter 18D for supplying a wait signal WS to the CPU 10 in response to signals from the CPU 10, memory interface 14 and state control circuits 18A to 18C, or for supplying the save and restore request signals SRQ and RRQ to the memory interface 14.

The signal lines 32A to 32E and 30C are all connected to respective input terminals of the state control circuits 18A to 18C. The signal line 32F is connected to an "A" input terminal of the state control circuit 18A, a "B" input terminal of the state control circuit 18B, and a "C" input terminal of the state control circuit 18C. A "1" level signal is supplied constantly to "B" and "C" input terminals of the state control circuit 18A, to "A" and "C" input terminals of the state control circuit 18B, and to "A" and "B" input terminals of the state control circuit 18C. Further, "A" and "B" output terminals of the state control circuits 18A to 18C are connected, respectively, to the signal lines 26A and 28A, 26B and 28B, and 26C and 28C, and the "B" and "C" output terminals of the state control circuits 18A to 18C are connected to the arbiter 18D through OR gates 18E and 18F, respectively. The signal lines 32C to 32E and 30C are connected to input terminals of the arbiter 18D, while the signal lines 30A, 30B and 34 are connected to output terminals of the arbiter 18D.

Figure 3:
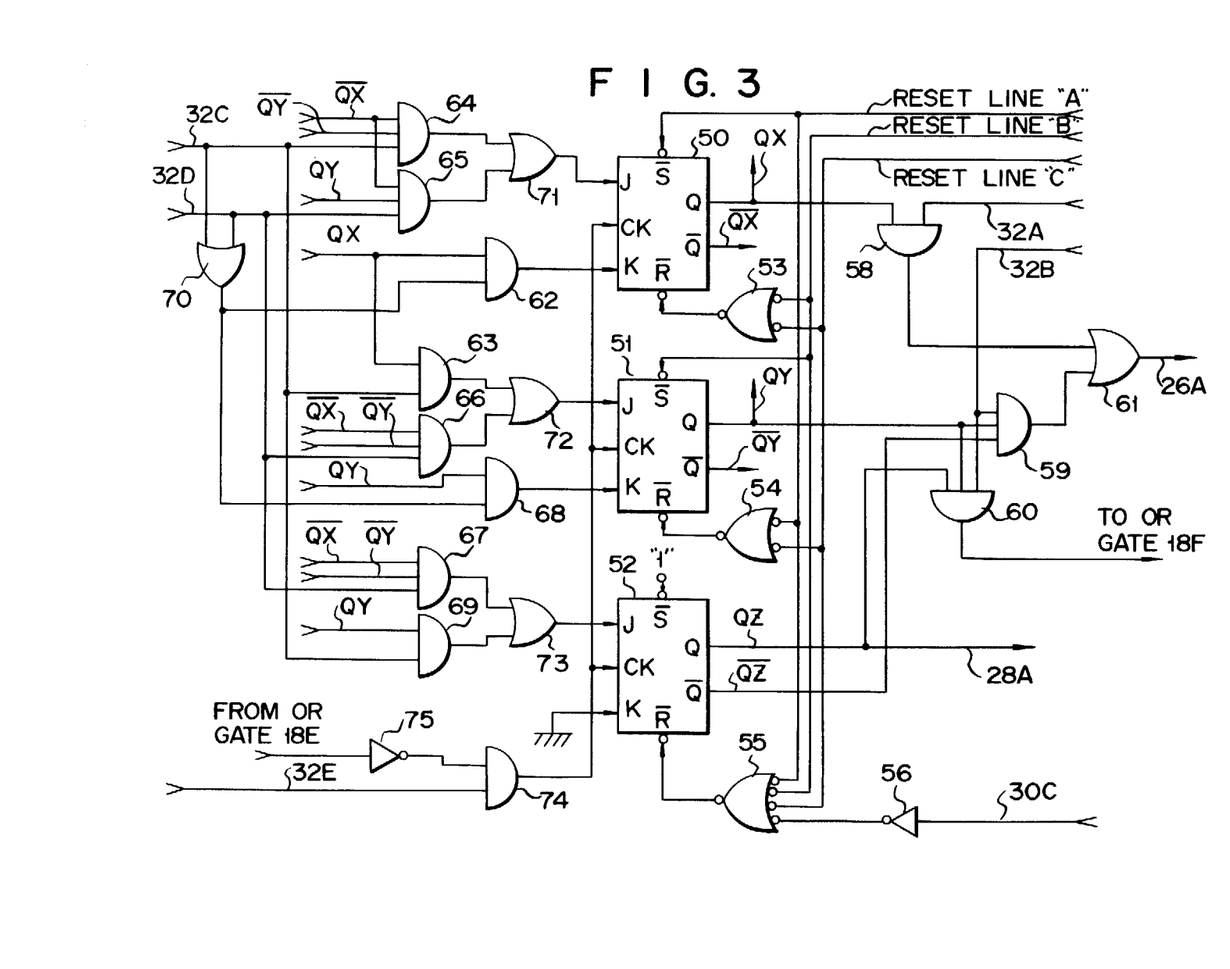
FIG. 3 is a circuit diagram of one of the state control circuits in the register control unit shown in FIG. 2.

FIG. 3 is a circuit diagram showing a detailed arrangement of the state control circuit 18A. The arrangement of each of the state control circuits 18B and 18C is substantially similar to the state control circuit 18A; therefore, descriptions regarding the arrangements of the state control circuits 18B and 18C will be omitted.

The state control circuit 18A has three J-K flip-flop circuits 50, 51 and 52. Reset lines "A" and "B" are connected to inverting set input terminals of the J-K flip-flop circuits 50 and 51. A "1" level signal is applied to an inverting set input terminal of the J-K flip-flop circuit 52. An output terminal of an input inverting type NOR gate 53, connected to reset lines "B" and "C", is connected to an inverting reset input terminal of the flip-flop circuit 50. An output terminal of an input inverting type NOR gate 54, connected to the reset lines "A" and "C", is connected to an inverting reset input terminal of the flip-flop circuit 51. An output terminal of an input inverting type NOR gate 55, whose input terminals are connected to the reset lines "A", "B" and "C" and to an output terminal of an inverter 56 connected the signal line 30C, is coupled to an inverting reset input terminal of the flip-flop circuit 52.

One input terminal of an AND gate 58 is connected to the signal line 32A while its other input terminal is connected to a Q output terminal of the flip-flop circuit 50. A Q output terminal of the flip-flop circuit 51 and the signal line 32B are respectively connected to first and second input terminals of each of AND gates 59, 60, and Q and $\overline{Q}$ output terminals of the flip-flop circuit 52 are respectively connected to third input terminals of AND gates 60 and 59. The Q output terminal of the flip-flop circuit 52 is further connected to the control line 28A. Output terminals of the AND gates 58 and 59 are connected to an OR gate 61 whose output terminal is connected to the control line 26A. An output terminal of the AND gate 60 is connected to the OR gate 18F shown in FIG. 2.

The Q output terminal of the flip-flop circuit 50 is further connected to first input terminals of AND gates 62 and 63, and its $\overline{Q}$ output terminal is connected to first input terminals of AND gates 64 to 67. The Q output terminal of the flip-flop circuit 51 is connected to a second input terminal of the AND gate 65 as well as to first input terminals of AND gates 68 and 69, while its $\overline{Q}$ output terminal is connected to second input terminals of the AND gates 64, 66 and 67. The signal line 32D is connected to third input terminals of the AND gates 65 to 67. The signal line 32C is connected to a third input terminal of the AND gate 64 and second input terminals of the AND gates 63 and 69. An output terminal of an OR gate 70, connected to the signal lines 32C and 32D, is connected to second input terminals of the AND gates 62 and 68.

Output terminals of the AND gates 64 and 65 are connected to a J input terminal of the flip-flop circuit 50 through an OR gate 71. Output terminals of the AND gates 63 and 66 are connected to a J input terminal of the flip-flop circuit 51 through an OR gate 72. Output terminals of the AND gates 67 and 69 are connected to a J input terminal of the flip-flop circuit 52 through an OR gate 73. K input terminals of the flip-flop circuits 50 and 51 are connected, respectively, to output terminals of the AND gates 62 and 68. A K input terminal of the flip-flop circuit 52 is grounded. Further, an output terminal of an AND gate 74 is connected to clock (CK) terminals of the flip-flop circuits 50 to 52. An output signal from the OR gate 18E, shown in FIG. 2, is supplied through an inverter 75 to one input terminal of the AND gate 74, while a clock pulse is supplied through the signal line 32E to the other input terminal.

The reset lines "A", "B" and "C" in FIG. 3 are connected to input terminals "A", "B" and "C" in FIG. 2, respectively. Namely, in FIG. 3, the reset line "A" is connected to the reset signal line 32F, and the reset lines "B" and "C" are pulled up to "1" level. In the case of constituting the state control circuit 18B, the reset line "B" is connected to the reset signal line 32F and the reset lines "A" and "C" are pulled up to "1" level. In the case of constituting the state control circuit 18C, the reset line "C" is connected to the reset signal line 32F and the reset lines "A" and "B" are pulled up to "1" level. In addition, in the case of constituting the state control circuits 18B and 18C, the output terminal of the OR gate 61 is connected to the control lines 26B and 26C, respectively. The Q output terminal of the flip-flop circuit 52 is connected to the control lines 28B and 28C.

Figure 4:
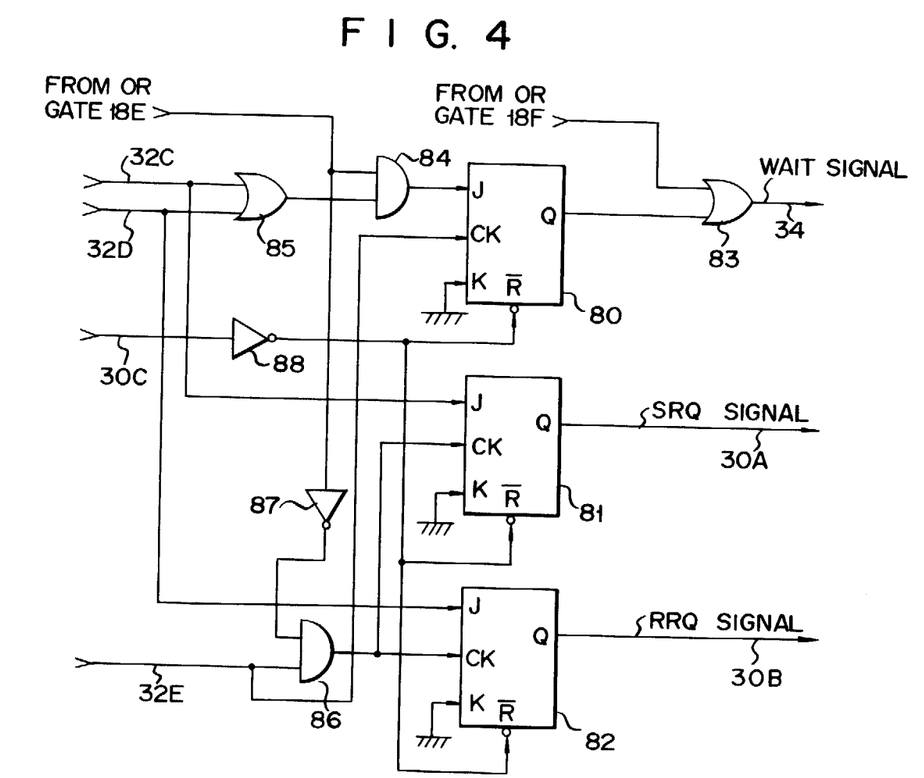
FIG. 4 is a circuit diagram of an arbiter in the register control unit shown in FIG. 2.

FIG. 4 is a block diagram showing a detailed arrangement of the arbiter 18D shown in FIG. 2. The arbiter 18D includes three J-K flip-flop circuits 80, 81 and 82. A Q output terminal of the flip-flop circuit 80, together with the output terminal of the OR gate 18F, shown in FIG. 2, is connected to an OR gate 83 whose output terminal is connected to the control line 34. Q output terminals of the flip-flop circuits 81 and 82 are connected to the signal lines 30A and 30B, respectively.

K input terminals of the flip-flop circuits 80 to 82 are grounded, and J input terminals are connected to an output terminal of an AND gate 84 and signal lines 32C and 32D.

One input terminal of the AND gate 84 is connected to the output terminal of the OR gate 18E, shown in FIG. 2, while the other input terminal is connected to an output terminal of an OR gate 85 whose input terminals are connected to the signal lines 32C and 32D.

The signal line 32E is connected to a CK terminal of the flip-flop circuit 80. An output terminal of an AND gate 86 is connected to CK terminals of the flip-flop circuits 81 and 82. One input terminal of the AND gate 86 is connected to the output terminal of the OR gate 18E through an inverter 87, while its other input terminal is connected to the signal line 32E. Further, the signal line 30C is connected through an inverter 88 to inverting reset input terminals of the flip-flop circuits 80 to 82.

Figure 5:
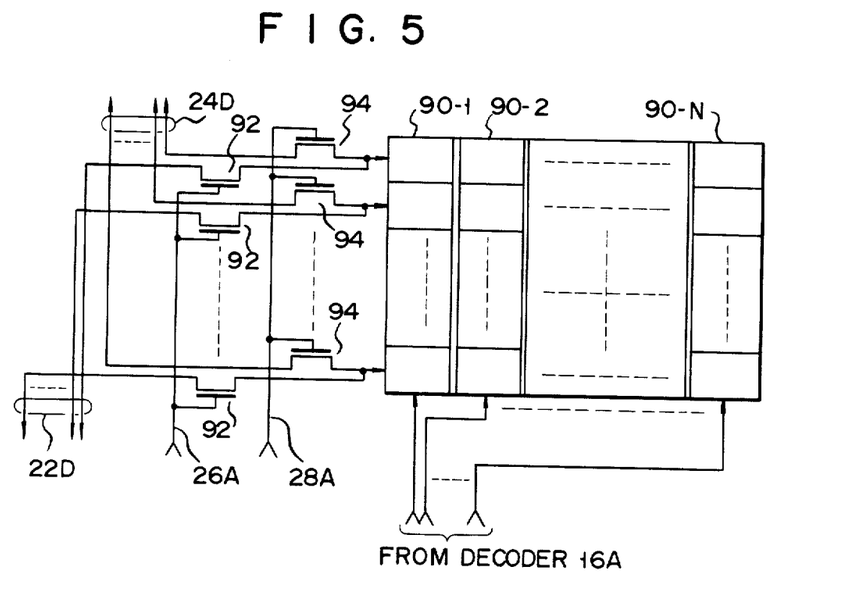
FIG. 5 is a circuit diagram of one of the register blocks used in the data processing apparatus shown in FIG. 1.

FIG. 5 shows an arrangement of the register block 12A. The register blocks 12B and 12C are also constituted and operated similar to the register block 12A; therefore, their descriptions are omitted.

The register block 12A includes N register groups 90-1 to 90-N, each having eight, sixteen or thirty-two one-bit registers. The register groups 90-1 to 90-N are selectively energized by selection signals from the decoder circuit 16A. The data transfer to a selected one of the register groups 90-1 to 90-N is executed between either this register group and the CPU 10 through the data bus 22D and a plurality of MOS transistors 92 whose conduction states are controlled by control signals via the control line 26A from the register control unit 18, or this register group and the memory interface 14 through the data bus 24D and a plurality of MOS transistors 94 whose conduction states are controlled by control signals via the control line 28A.

Figure 6:
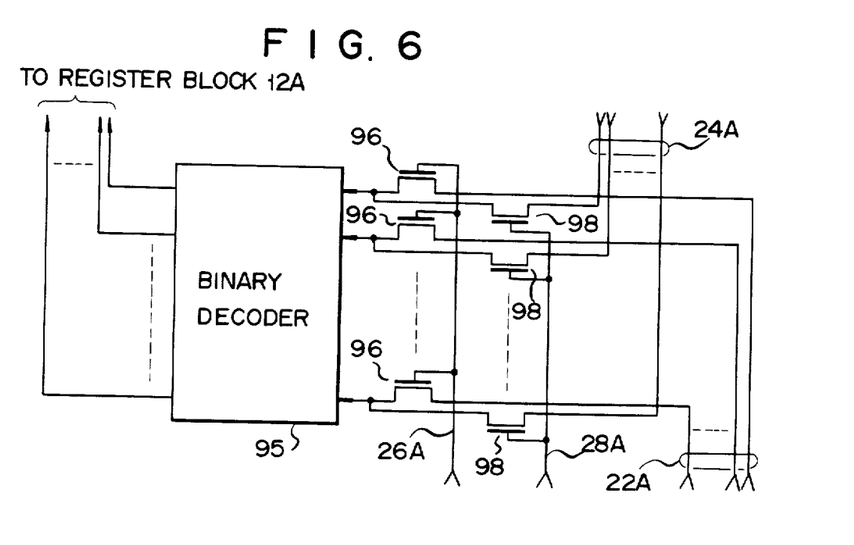
FIG. 6 is a circuit diagram of one of the decoder circuits used in the data processing apparatus shown in FIG. 1.

FIG. 6 shows an arrangement of the decoder circuit 16A. The decoder circuits 16B and 16C are also constituted and operated similar to the decoder circuit 16A; therefore, their descriptions are omitted.

The decoder circuit 16A has a binary decoder 95. N output terminals of the binary decoder 95 are connected to the N register groups 90-1 to 90-N in the register block 12A. The binary decoder 95 receives addresses supplied through either the address bus 22A from the CPU 10 through MOS transistors 96 whose conduction states are controlled by control signals via the control line 26A, or the address bus 24A from the memory interface 14 through MOS transistors 98 whose conduction states are controlled by control signals on the line 28A. Namely, the binary decoder 95 converts the input data of m ($N \leq 2^m$) bits inputted through the MOS transistors 96 or 98 into the N-bit data, and then supplies the N-bit data to the register groups 90-1 to 90-N.

Figure 7:
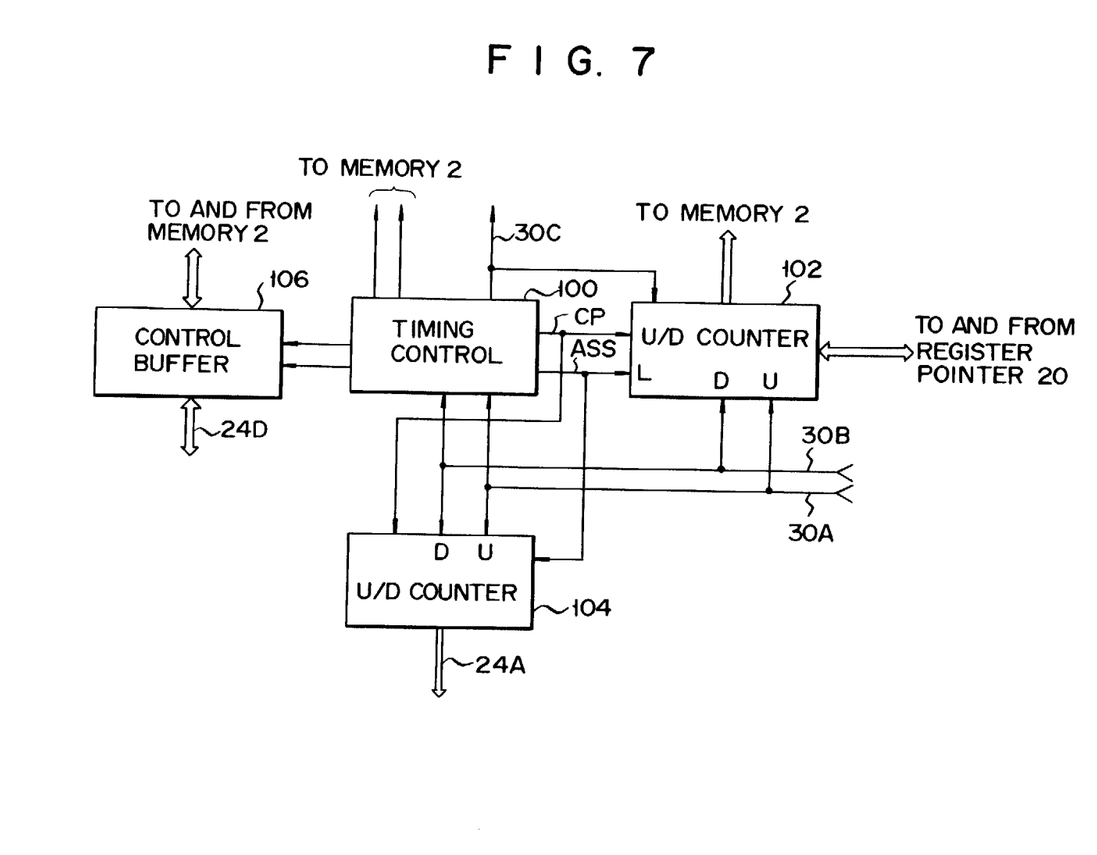
FIG. 7 is a circuit diagram of a memory interface used in the data processing apparatus shown in FIG. 1.

FIG. 7 shows an arrangement of the memory interface 14. The memory interface 14 comprises a timing control 100 for generating various kinds of control signals in response to the save request signal SRQ and restore request signal RRQ which are supplied through the signal lines 30A and 30B, an up/down counter 102 for supplying addresses to the external memory 2, an up/down counter 104 for supplying addresses to the decoder circuits 16A and 16C, and a direction control buffer 106, connected between the external memory 2 and the register blocks 12A to 12C, for controlling the data transfer direction.

Assume now that the save request signal SRQ is generated through the signal line 30A from the register control unit 18. This being the case, both of the U/D counters 102 and 104 are set in the up counting mode, and the timing control 100 sets the external memory 2 in the writing state and also sets the direction control buffer 106 in the first mode wherein data transfer from the register block 12A, 12B or 12C into the memory 2 is permitted. Further, the timing control 100 supplies an address setting signal ASS to the U/D counters 102 and 104.

In the up or down counting mode, the contents i of the register pointer 20, or the value (i-1) which is obtained by subtracting one from content i, is set in the U/D counter 102 in response to the signal ASS. When the U/D counter 104 receives the address setting signal ASS in the up or down counting mode, the contents are set into an initial state with data of "1" or "N". Thereafter, the timing control 100 supplies a clock pulse CP to the counters 102 and 104 and memory 2. Thus, the data from the first register group 90-1 of a selected one of the register blocks 12A to 12C is written through the buffer 106 into the memory location in the memory 2 designated by the address i from the counter 102. Thereafter, the contents of the counters 102 and 104 are each increased by one count. In this way, whenever the clock pulse is generated from the timing control 100, the data is sequentially read out from the register group of the selected register block and then sequentially written into the memory locations in the memory 2 designated by the addresses from the counter 102. As described above, when N clock pulses are generated and the data in all of the register groups 90-1 to 90-N of the selected register blocks are written into the memory locations in the memory 2 designated by the addresses i to (i+N-1), the timing control 100 generates the END signal. This END signal is supplied through the signal line 30C to the register control unit 18, as well as to the counter 102, thereby setting the content (i+N) of the counter 102 into the register pointer 20.

Next, assuming that the restore request signal RRQ is generated through the signal line 30B from the register control unit 18, both of the counters 102 and 104 are set in the down counting mode. The timing control 100 sets the external memory 2 in the readout state and also sets the direction control buffer 106 in the second mode wherein data transfer from the memory 2 into the register blocks 12A, 12B 12C is permitted. Further, the timing control 100 supplies the address setting signal ASS to the counters 102 and 104, thereby setting both the value (i+N-1), which is obtained by subtracting one from the data (i+N) from the register pointer 20, into the counter 102, and the initial value "N" into the counter 104. Thereafter, N clock pulses CP are generated from the timing control 100, and the data in the memory locations in the memory 2, designated by the addresses (i+N-1) to i, are sequentially read out and written into the register groups 90-N to 90-1 of a selected one of the register blocks 12A to 12C. After that, the END signal is generated from the timing control 100 and the contents i of the counter 102 are set into the register pointer 20.

Each of the register blocks 12A to 12C is selectively set into the state "A", "B", "C", "D", or "E" in response to Q output signals QX, QY and QZ from the J-K flip-flop circuits 50 to 52 of the corresponding state control circuit 18A, 18B or 18C. Namely, when the Q output signals (QX, QY, QZ) are set, respectively, to (1, 0, 0), (0, 1, 0), (0, 0, 0), (0, 1, 1), or (0, 0, 1), the register block is set in the state "A", "B", "C", "D", or "E".

It is the register block set in either state "A" or "B" that can be accessed by the CPU 10 during execution of a program. The register block set in state "A" includes the registers which can be used for general purpose use in execution of a program by the CPU 10, as well as the registers which are used to logically pass the parameters to the called subroutine program, and the registers which are used to logically receive the return data from the called subroutine program. The register block set in state "B" includes the registers that logically receive, in execution of the called program, the parameters which were logically passed from the register block having been set in state "A" in execution of the calling program, and the registers that hold the return data indicative of the result of the execution of the subroutine program on the basis of these parameters. For example, the register block which has been set in state "A" to execute the main routine program is set in state "B" when the subroutine call occurs. That is, when the register block is set in state "A", the parameters necessary to execute the called subroutine program are set into this register block. When this subroutine program is executed, the register block is set in state "B" and the CPU 10 executes the subroutine program using the parameters held in the register block set in the state "B".

The register block set in state "C" cannot be accessed by the CPU 10. The register blocks set in the states "D" and "E" can receive the data saved in the external memory 2 and can supply the data which should be saved in the external memory 2.

Figure 8:
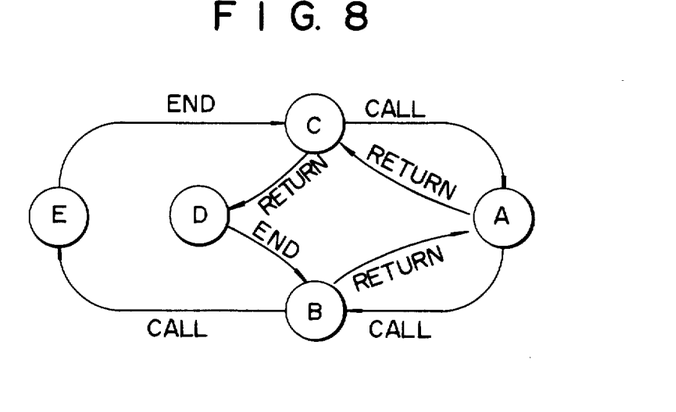
FIG. 8 is a state transition diagram showing state transition of one of the register blocks shown in FIG. 1.

The state of the CPU accessible register block is changed, as shown in the state transition diagram of FIG. 8, when the CPU 10 generates the subroutine call signal SC and the return signal SR through the signal lines 32C and 32D during execution of the program in response to the occurrence of the subroutine call and return, and when the memory interface 14 generates the END signal in response to either the occurrence of the subroutine call or return upon completion of the data transfer between the external memory 2 and the register blocks 12A to 12C. Practically speaking, when the subroutine call occurs while the register block is set in the state "A", "B" or "C", this register block is set, respectively, in state "B", "E" or "A". When the return occurs in the case where the register block is set in the state "A", "B" or "C", this register block is then set in state "C", "A" or "D". When the END signal is generated in the case where the register block is set in the state "D" or "E", this register block is then set in state "B" or "C".

Figure 9:
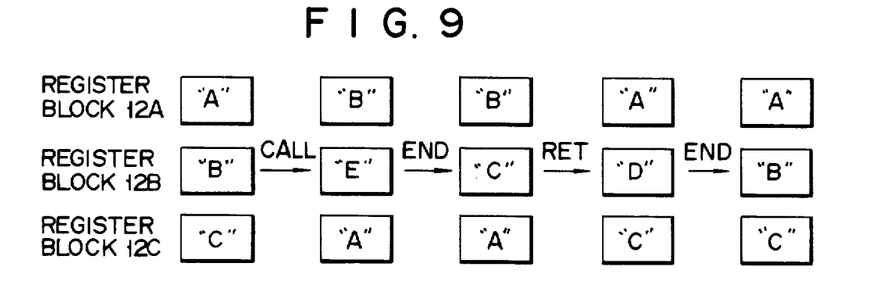
FIG. 9 is a state transition diagram showing state transition of the register blocks shown in FIG. 1 when a subroutine call and a return occur in this sequence.
Figure 10:
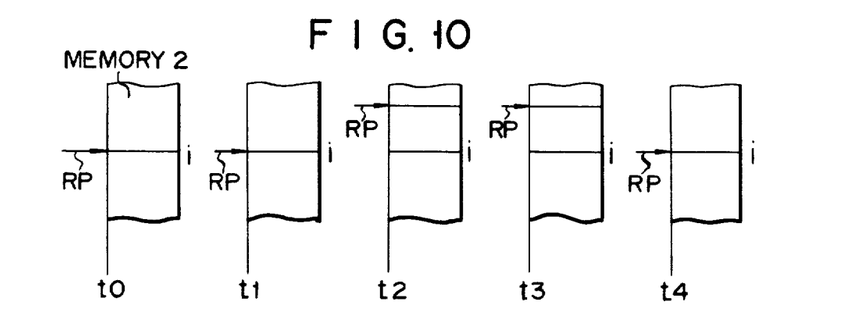
FIG. 10 is an address transition diagram showing a change of the address position indicated by a register pointer shown in FIG. 1 when a subroutine call and a return occur in this sequence.

The operation of the data processing apparatus shown in FIGS. 1 to 7 will now be described with reference to the state transition diagram of FIG. 9, showing the states of the register blocks 12A to 12C which change according to their dependence on the generation of subroutine call signal SC, return signal SR and completion signal end, and to the pointer position transition diagram of FIG. 10, showing the pointer position of the register pointer 20 which changes in response to the same signals.

First, assume that the reset signal RST, at a "0" level, is supplied from the CPU 10 through the reset signal line 32F to the register control unit 18 at time $t_0$. The reset signal RST is supplied to the input terminal "A" of the state control circuit 18A, the input terminal "B" of the state control circuit 18B, and the input terminal "C" of the state control circuit 18C.

Since only the reset line "A" in the state control circuit 18A is set at a "0" level, only the flip-flop circuit 50 in FIG. 3 is set, while the flip-flop circuits 51 and 52 are reset by output signals from the NOR gates 54 and 55. Thus, output signals QX1 of a "1" level, QY1 of a "0" level and QZ1 of a "0" level are generated from the Q output terminals of the flip-flop circuits 50 to 52 in the state control circuit 18A, thereby setting the register block 12A in state "A".

Since only the reset line "B" in the state control circuit 18B is set at a "0" level, only the flip-flop circuit 51 in FIG. 3 is set, while the flip-flop circuits 50 and 52 are reset by the output signals from the NOR gates 53 and 55. Thus, output signals QX2 of a "0" level, QY2 of a "1" level and QZ2 of a "0" level are generated from the Q output terminals of the flip-flop circuits 50 to 52 in the state control circuit 18B, thereby setting the register block 12B in state "B".

Since the reset line "C" in the state control circuit 18C is set at a "0" level, the flip-flop circuits 50 to 52 in FIG. 3 are reset, respectively, by the output signals from the NOR gates 53 to 55. Thus, output signals QX3, QY3 and QZ3 of a "0" level are generated from the Q output terminals of the flip-flop circuits 50 to 52 in the state control circuit 18C, thereby setting the register block 12C in state "C".

As described above, when the reset signal RST of a "0" level is generated at time $t_0$, the register blocks 12A to 12C are set in states "A", "B" and "C", respectively, as shown in FIG. 9. In one instance, in this case, the pointer position RP of the register pointer 20 is set to the initial position i by the CPU 10.

In the case where the CPU 10 accesses a register under such a state, it supplies the address indicative of the number of this register through the address bus 22A, and also generates either the selection signal AS or BS through the signal line 32A or 32B. For instance, assume now that the selection signal AS of a "1" level is generated from the CPU 10 through the signal line 32A to access the register block 12A set in state "A". The selection signal AS of a "1" level is transmitted via the control line 26A through the AND gate 58 which is enabled by the Q output signal QX1 of the flip-flop circuit 50 and the OR gate 61 in the register block 12A. The "1" level signal in the control line 26A is supplied to the register block 12A and decoder circuit 16A, thereby rendering the MOS transistors 92 in the register block 12A and the MOS transistors 96 in the decoder circuit 16A conductive. Due to this, the address transmitted from the CPU 10 through the address bus 22A is decoded by the binary decoder 95 in the decoder circuit 16A, and one register group in the register block 12A is selected. Thus, the data transfer can be performed between this selected one of the register groups 90-1 to 90-N in the register block 12A and the CPU 10.

In case of accessing the register block 12B set in state "B", the selection signal BS of a "1" level is generated through the signal line 32B. This "1" level selection signal BS is transmitted via the control line 26B through the AND gate 59 and OR gate 61 in the register block 12B. Due to this, the MOS transistors 92 in the register block 16B, and the MOS transistors 96 in the decoder circuit 16B are rendered conductive, so that the data transfer can be performed between the CPU 10 and one of the register groups 90-1 to 90-N in the register block 12B, as selected by the address from the CPU 10.

Next, if a subroutine call occurs at time $t_1$ when the CPU 10 continuously executes the program, the CPU 10 writes the parameters necessary to execute this subroutine into the register block 12A set in state "A", and also generates the subroutine call signal SC of a "1" level through the signal line 32C. This "1" level subroutine call signal SC is supplied to the state control circuits 18A to 18C.

In the state control circuit 18A, the "1" level signal SC is supplied to the J input terminal of the flip-flop circuit 51 through the AND gate 63 and OR gate 72, and is also supplied to the K input terminal of the flip-flop circuit 50 through the OR gate 70 and AND gate 62. The output signals of the OR gates 71 and 73, and AND gate 68 are held at a "0" level irrespective of the generation of the "1" level signal SC. In this case, since signals on the lines 28A, 28B and 28C are all "0" the OR gate 18E produces an output signal of "0" level which is then inverted by the inverter 75. Therefore, the sampling pulse SP on the signal line 32E is supplied to the clock terminals of the flip-flop circuit 50 to 52 through the AND gate 74 which is enabled by the "1" output signal from the inverter 75. Consequently, the output states of the flip-flop circuits 50 and 51 are inverted, and the output signals QX1 of a "0" level and QY1 of a "1" level are generated from the Q output terminals of the flip-flop circuits 50 and 51, respectively. In contrast, the output state of the flip-flop circuit 52 is not changed and the signal QZ1 from the Q output terminal of the flip-flop circuit 52 is held at a "0" level. Therefore, the Q output signals QX1, QY1 and QZ1 of the flip-flop circuits 50 to 52 in this state, control circuit 18A to become "0", "1" and "0", respectively, thereby setting the register block 12A in state "B".

Similarly, the flip-flop circuits 50 to 52 in each of the state control circuits 18B and 18C generate the output signals QX2 of a "0" level, QY2 of a "0" level and QZ2 of a "1" level, as well as the output signals QX3 of a "1" level, QY3 of a "0" level and QZ3 of a "0" level in response to the "1" level signal SC, thereby setting the register blocks 12B and 12C in the states "E" and "A", respectively. Under such states, the CPU 10 can access the register blocks 12A and 12C, while the register block 12B is set in a state wherein data can be saved.

When the subroutine call signal SC is inputted through the signal line 32C to the arbiter 18D shown in FIG. 4, the output state of the flip-flop circuit 81 is inverted and the save request signal of a "1" level is generated through the signal line 30A from the flip-flop circuit 81 and transmitted to the memory interface 14. The memory interface 14 can access the register block connected to the state control circuit generating the "1" level signal QZ (i.e., QZ1, QZ2 or QZ3), namely, the register block set in the state "D" or "E". Under the current situation, since the register block 12B has been set in state "E", the MOS transistors 94 in the register block 12B and the MOS transistors 98 in the decoder circuit 16B are rendered conductive. As described with reference to FIG. 7, the memory interface 14 reads out the data from the register groups 90-1 to 90-N in the register block 12B in response to the save request signal SRQ, and sequentially writes this data into the memory locations in the external memory 2 designated by the addresses i to (i+N−1).

In this way, when the data from the register block 12B has been completely saved in the external memory 2 at time $t_2$, the memory interface 14 then generates the END signal. Thus, the content of the register pointer 20 is set into (i+N), as mentioned before. In addition, in response to the END signal, the "0" level signal is generated from the NOR gate 55 in the state control circuit 18B, and the flip-flop circuit 52 is reset, thereby allowing the output signal QZ of a "0" level to be generated from the Q output terminal of the flip-flop circuit 52. Thus, all of the output signals QX, QY and QZ from the state control circuit 18B become a "0" level, thereby setting the register block 12B in state "C". It should be noted that the saving of the data from the register block 12B in the external memory 2 can be executed quite independently of the operation of the CPU 10 and in parallel with the operation of the CPU 10; therefore, the CPU 10 can access the register blocks 12A and 12C at arbitrary times, even when the data is saved for the time interval from time $t_1$ to $t_2$. Due to this, the CPU 10 can execute the subroutine program for this time interval by use of, for instance, the parameters in the register block 12A which is now set in state "B".

Assuming that a subroutine return occurs at time $t_3$ when the CPU 10 is executing the subroutine program, the CPU 10 writes the data indicative of the result of the execution of this subroutine program into the register block 12A, and also generates the return signal SR of a "1" level through the signal line 32D. This return signal SR is supplied to the state control circuits 18A to 18C and arbiter 18D.

When the "1" level return signal SR is supplied to the state control circuit 18A, the signals QX1, QY1 and QZ1 are set, respectively, to "0", "1" and "0"; therefore, the "1" level signal is supplied to the J input terminal of the flip-flop circuit 50 through the AND gate 65 and OR gate 71, and to the K input terminal of the flip-flop circuit 51 through the AND gate 68. Thus, the output states of the flip-flop circuits 50 and 51 are inverted. Consequently, the signals QX1 of a "1" level, QY1 of a "0" level and QZ1 of a "0" level are generated from the Q output terminals of the flip-flop circuits 50 to 52, thereby setting the register block 12A in state "A".

When the "1" level return signal SR is supplied to the state control circuit 18B, all of the signals QX2, QY2 and QZ2 are set at a "0" level, so that the "1" level signal is supplied to the J input terminal of the flip-flop circuit 51 through the AND gate 66 and OR gate 72, and to the J input terminal of the flip-flop circuit 52 through the AND gate 67 and OR gate 73, the output states of the flip-flop circuits 51 and 52 being inverted. Due to this, the signals QX2 of a "0" level, QY2 of a "1" level and QZ2 of a "1" level are generated from the Q output terminals of the flip-flop circuits 50 to 52 to thereby set the register block 12B in state "D".

Further, when the "1" level return signal SR is supplied to the state control circuit 18C, the signals QX3, QY3 and QZ3 are set, respectively, at "1", "0" and "0" levels; therefore, the "1" level signal is supplied to the K input terminal of the flip-flop circuit 50 through the AND gate 62, thereby inverting the output state of the flip-flop circuit 50. Thus, the signals QX3, QY3 and QZ3, which are all at a "0" level, are generated from the Q output terminal of the flip-flop circuits 50 to 52, thereby setting the register block 12C in state "C".

Conversely, when the "1" level return signal SR is supplied to the arbiter 18D in FIG. 4, the output state of the flip-flop circuit 82 is inverted, and the "1" level return request signal RRQ is supplied from the Q output terminal of the flip-flop circuit 82 to the memory interface 14 through the signal line 30B. Under the current situation, the register block 12B is set in state "D" and the "1" level output signal QZ2 is generated from the flip-flop circuit 52 of the state control circuit 18B, so that the memory interface 14 executes the data transfer between the external memory 2 and the register block 12B. That is, the memory interface 14 sequentially reads out the data from the memory locations in the external memory 2, designated by the addresses (i+N−1) to i, in response to the "1" level return request signal RRQ from the arbiter 18D, and then sequentially writes the readout data into the register groups 90-N to 90-1 in the register block 12B.

During the restoring operation of the data, the CPU 10 can execute the main routine program using the data of the result of the execution of the subroutine program by accessing the register block 12A set in state "A". However, since the register block 12B, which should be set in state "B", has been set in state "D" to restore the data, inhibition is requested such that the CPU 10 cannot access the register block 12B. For this purpose, when the CPU 10 generates the BS signal through the signal line 32B to access the register block 12B, which should have been set in state "B", if the accessed register block is still being kept in state "D" the BS signal is transmitted as a WAIT signal to the CPU 10 through the AND gate 60 which is enabled by the Q output signals QY2 and QZ2 in the state control circuit 18B, the OR gate 18F, and the OR gate 83 of the arbiter 18D. Due to this, the CPU 10 cannot actually access the register block set in the state "D".

After completion of the restorage of the data at time $t_4$, the END signal is generated from the memory interface 14 and the address i is set into the register pointer 20. When this END signal is supplied to the state control circuit 18B, the output state of the flip-flop circuit 52 in the state control circuit 18B is inverted, and the "0" level signal QZ2 is generated from the Q output terminal of the flip-flop circuit 52. Due to this, the register block 12B is set in state "B" and the AND gate 60 in the state control circuit 18B is disabled. Thus, the WAIT signal to the CPU 10 is cut off, thereby permitting the CPU 10 to access the register block 12B. While the saving or restorage of the data is being executed between a selected one of the register blocks 12A to 12C and the external memory 2, if the next subroutine call or return occurs after the occurrence of a subroutine call or a return, the subroutine call signal SC or return signal SR is supplied to the J input terminal of the flip-flop circuit 80 through the OR gate 85 and the AND gate 84 which is enabled by the output signal from the OR gate 18E, thereby inverting the output state of the flip-flop circuit 80. Therefore, the "1" level output signal is generated from the Q output terminal of the flip-flop circuit 80 and supplied as a WAIT signal to the CPU 10 through the OR gate 83, thereby temporarily stopping the operation of the CPU 10. At this time, since the AND gates 74 and 86 are disabled in accordance with the output signal from the OR gate 18E, the sampling pulse SP is prevented from being supplied to the clock terminals of the flip-flop circuits 50 to 52, 81 and 82, keeping the states of the flip-flop circuit unchanged. Therefore, "save" and "restore" operations can be properly effected.

In the foregoing data processing apparatus, there are three register blocks which can be used as general purpose registers or registers to pass and receive parameters, the register block accessed as a register block set in state "A" to execute the program in which a subroutine call has occurred, being accessed as a register block set in state "B" in case of executing this called subroutine program. Therefore, there is no need to actually transfer the data to pass and receive data such as parameters or the like in this register block. The register block used as a general purpose register in execution of the called program was set in state "C" before the subroutine call occurs, and the register block which was set in state "A" before the subroutine call occurs cannot be used as a general purpose register. Therefore, it is possible to hold the contents of the register without effecting PUSH and POP instructions which are required for the conventional microprocessor to hold the contents of the register when a subroutine call occurs. Thus, the program executing speed is improved. In addition, since it is unnecessary to make a program to execute such a kind of data shift, the program size in the CPU 10 can be small. Further, even in the case where multiple subroutine calls and returns occur, the saving or restorage of data between the register block and the external memory 2 is executed independently of the operation in the CPU, so that it is sufficient to use a limited number of register blocks; three, for example. The overhead required for data transfer between the external memory 2 and the register block 12A, 12B or 12C can therefore, be so suppressed and shortened as to be ignored.

In addition, in the case where the CPU 10 accesses the register block set in state "E", the register control unit 18 detects this state and temporarily stops the operation of the CPU 10 until the data is completely restored. Therefore, there is no need to control the saving and restorage of data by way of a program.

Moreover, since the CPU 10 executes the passing and reception of data with the register block in the microprocessor 1, it can always directly access this register block. Due to this, the overhead time period necessary for address calculation or memory fetch, having been a problem in a conventional method where parameters are set into the stack, becomes unnecessary.

Further, since the register block used to execute a program which includes a subroutine call is arranged in the microprocessor 1, by keeping, upon occurrence of the subroutine call, and in this register block, the content of either the program counter in the CPU 10 or processor state words stored in the built-in memory, the state return of the CPU 10 can, upon occurrence of the return, be executed at a high speed.

What is claimed is:
1. A data processing apparatus comprising:
   a memory;
   a plurality of register blocks, each including a plurality of registers and each including state means for setting the corresponding register into one of a plurality of states including a "save" state, in which the corresponding register block supplies data to be saved in said memory for a subroutine call, a "restore" state in which the corresponding register block receives saved data from said memory for a subroutine return, an access state in which the correponding register can be accessed for a subroutine call or return to pass parameters, and a use state;
   program executing means for accessing at least one of said plurality of register blocks and for executing a program including a subroutine call and a return, said program execution means including means, responsive to the program subroutine call and return, for generating a subroutine call signal and a return signal, respectively;
   memory interface means for holding addresses for said memory, responsive to said subroutine call signal and return signal generated from said program executing means, for executing a data transfer between said memory and one of said plurality of register blocks set in the "save" state or the "restore" state, and for generating an end signal upon completion of said data transfer; and
   register control means for setting a first one of said plurality of register blocks into said access state thereby allowing access by said program executing means in response to said subroutine call signal or return signal, for selectively setting a second one of said register blocks into said "save" state or "restore" state, and, responsive to said end signal, for selectively setting a third of said plurality of register blocks into said use state for use by said program executing means.

2. A data processing apparatus according to claim 1, where each of said register blocks includes
   a register section,
   first switching means for selectively connecting said register section with said program executing means, and
   a second switching means for selectively connecting said register section with said memory interface means.

3. A data processing apparatus according to claim 2, wherein said register control means includes a plurality of control means each corresponding to and being connected to a different one of said register blocks for respectively rendering nonconductive and conductive said first and second switching means of the corresponding one of said register blocks in response to said subroutine call signal or return signal, for rendering nonconductive said second switching means of said corresponding register block in response to said end signal, and for permitting said first switching means of said corresponding register block to become conductive in response to an access signal from said program executing means.

4. A data processing apparatus according to claim 3, wherein said register control means further includes an arbiter to generate a save request signal or a restore request signal in response to said subroutine call signal or return signal, respectively, and wherein said memory interface means comprises:
  address designating means for designating a memory location in said memory means; and
  data transfer means for saving data from one of said register blocks set in the "save" state in the memory location in said memory means designated by said address designating means in response to said save request signal, and for storing the data from the memory location in said memory means designated by said address designating means to one of said register blocks set in the "restore" state in response to said restore request signal.

5. A data processing apparatus according to claim 4, wherein each of said control means includes:
  first switch control circuit means for generating a first switch control signal in response to said subroutine call signal or return signal, for rendering said first switching means of said corresponding register block conductive, and for stopping the generation of said first switch control signal in response to said end signal; and
  second switch control circuit means for rendering said second switching means nonconductive when said first switch control signal is generated, for generating a second switch control signal in response to said access signal from said program executing means when said first switch control signal is not generated, and for thereby rendering said second switching means of said corresponding register block conductive.

6. A data processing apparatus according to claim 5, wherein said register control means further includes a wait signal generator for generating a wait signal to temporarily stop the operation of said program executing means in response to said subroutine call signal or return signal generated when one of said register blocks is set in the "save" or "restore" state.

7. A data processing apparatus according to claim 4, wherein said register control means further includes a wait signal generator for generating a wait signal to temporarily stop the operation of said program executing means in response to said subroutine call signal or return signal generated when one of said register blocks is set in the "save" or "restore" state.

8. A data processing apparatus according to claim 1, wherein said register control means further includes
  an arbiter to generate a save request signal and a restore request signal in response to said subroutine call signal and return signal, respectively, and wherein said memory interface means includes
  address designating means for designating a memory location in said memory; and
  data transfer means, responsive to said save request signal, for saving data from one of said register blocks set in the "save" state in the memory location in said memory means designated by said address designating means, and, responsive to said restore request signal, for restoring the data from the memory location in said memory means designated by said address designating means to one of said register blocks set in the "restore" state.

9. A data processing apparatus comprising:
  a memory;
  three register blocks, each of which includes a plurality of registers and each including state means for setting the corresponding register into one of a plurality of states including a "save" state, in which the corresponding register block supplies data to be saved in said memory for a subroutine call, a "restore" state in which the corresponding register block recieves saved data from said memory for a subroutine return, an access state in which the corresponding register can be accessed for a subroutine call or return to pass parameters, and a use state;
  program executing means for accessing at least one of said three register blocks and for executing a program including a subroutine call and a return, said program execution means including means, responsive to the subroutine call and return, for generating a subroutine call signal and a return signal, respectively;
  memory interface means for holding addresses for said memory, responsive to said subroutine call signal and said return signal being generated from said program executing means, for executing a data transfer between said memory and the one of said plurality of register blocks set in the "save" state or the "restore" state, and for generating an end signal upon completion of said data transfer; and
  register control means for setting a first one of said three register blocks into the "save" state or "restore" state in response to said subroutine call signal or return signal, respectively, from said program executing means, responsive to said end signal, for setting a second one of said plurality of register blocks into a use state for use by said program executing means and for setting a third register block into an access state for said program executing means.

10. A data processing apparatus according to claim 9, wherein each of said register blocks includes
  a register section,
  first switching means for selectively connecting said register section with said program executing means,
  and a second switching means for selectively connecting said register section with said memory interface means.

11. A data processing apparatus according to claim 10, wherein said register control means includes a plurality of contol means each corresponding to and being connected to a different one of said register blocks, for respectively rendering nonconductive and conductive said first and second switching means of the corresponding one of said register blocks in response to said subroutine call signal or return signal, for rendering nonconductive said second switching means of said corresponding register block in response to said end signal, and for permitting said first switching means of said corresponding register block to become conductive in response to an access signal from said program executing means.

12. A data processing apparatus according to claim 11, wherein said register control means further includes an arbiter to generate a save request signal or a restore request signal in response to said subroutine call signal or return signal, respectively, and wherein said memory interface means comprises:

address designating means for designating a memory location in said memory means; and data transfer for saving data from one of said register blocks set in the "save" state in the memory location in said memory means designated by said address designating means in response to said save request signal, and for storing the data from the memory location in said memory designated by said address designating means to one of said register blocks set in the "restore" state in response to said restore request signal.

13. A data processing apparatus according to claim 12, wherein each of said control means includes:

first switch control circuit means for generating a first switch control signal in response to said subroutine call signal or return signal, for rendering said first switching means of said corresponding register block conductive, and for stopping the generation of said first switch control signal in response to said end signal; and second switch control circuit means for rendering said second switching means nonconductive when said first switch control signal is generated, for generating a second switch control signal in response to said access signal from said program executing means when said first switch control signal is not generated, and for thereby rendering said second switching means of said corresponding register block conductive.

14. A data processing apparatus according to claim 13, wherein said register control means further includes a wait signal generator for generating a wait signal to temporarily stop the operation of said program executing means in response to said subroutine call signal or return signal generated when one of said register blocks is set in the "save" or "restore" state.

15. A data processing apparatus according to claim 12, wherein said register control means further includes a wait signal generator for generating a wait signal to temporarily stop the operation of said program executing means in response to said subroutine call signal or return signal generated when one of said register blocks is set in the "save" or "restore" state.

16. A data processing apparatus according to claim 1, wherein said register control means further includes an arbiter to generate a save request signal or a restore request signal in response to said subroutine call signal or return signal, and wherein said memory interface means includes address designating means for designating a memory location in said memory means; and data transfer means, responsive to said save request signal, for saving data from one of said register blocks set in the "save" state in the memory location in said memory means designated by said address designating means, and, responsive to said restore request signal, for storing the data from the memory location in said memory means designated by said address designating means to one of said register blocks set.

* * * * *